United States Patent
Darrow

[15] 3,702,939
[45] Nov. 14, 1972

[54] FAIL-SAFE COMPARATOR
[72] Inventor: John O. G. Darrow, Murrysville, Pa.
[73] Assignee: Westinghouse Air Brake Company, Swissvale, Pa.
[22] Filed: March 4, 1971
[21] Appl. No.: 120,993

[52] U.S. Cl. ..........................307/2, 324/98, 324/127
[51] Int. Cl. ...............................................G01r 17/02
[58] Field of Search ......307/2; 324/98, 99, 117, 127, 324/140

[56] References Cited
UNITED STATES PATENTS

| | | | |
|---|---|---|---|
| 2,689,328 | 9/1954 | Logan | 324/117 R |
| 2,892,155 | 6/1959 | Radus et al. | 324/117 R |
| 2,888,645 | 5/1959 | Hoft et al. | 324/98 X |
| 2,338,423 | 1/1944 | Geyger | 324/117 R |

Primary Examiner—Robert K. Schaefer
Assistant Examiner—William J. Smith
Attorney—H. A. Williamson, A. G. Williamson, Jr. and J. B. Sotak

[57] ABSTRACT

This disclosure relates to a fail-safe comparator circuit having an input transformer, the primary of which is fed by an a.c. signal voltage. The secondary winding of the first transformer is serially connected to the primary winding of a saturable type of output transformer. A current-limiting resistor forms a series circuit with the secondary winding of the input transformer and the primary winding of the output transformer. A separate d.c. input voltage is applied to each end of the series circuit so that a.c. output signals are induced into the secondary winding of the output transformer when and only when the d.c. input voltages are in agreement and no critical circuit or component failure is present.

6 Claims, 1 Drawing Figure

PATENTED NOV 14 1972          3,702,939
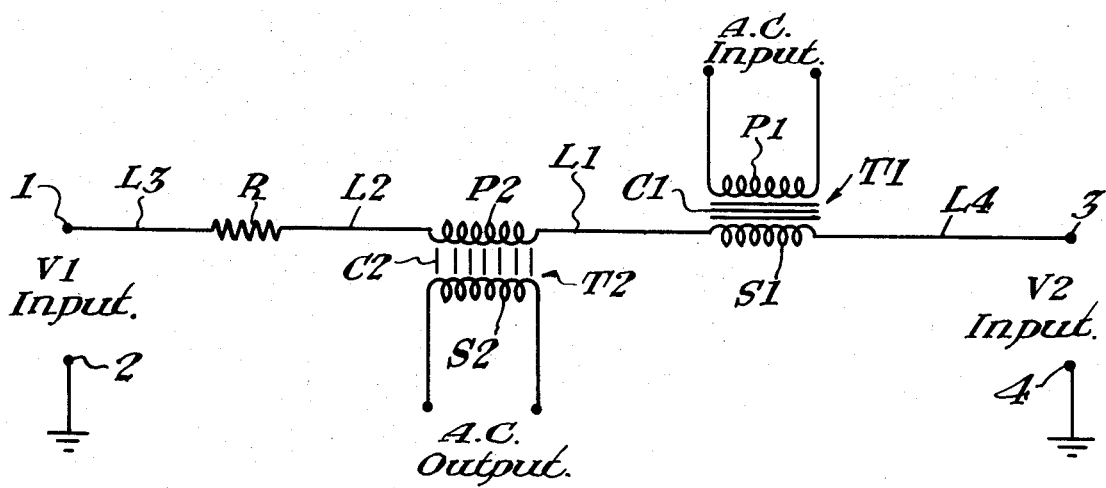
INVENTOR,
John O. G. Darrow.
BY
John B. Sotak

FAIL-SAFE COMPARATOR

My invention relates to a fail-safe circuit arrangement and more particularly to voltage comparator for measuring the amplitudes of two d.c. input signals and for producing an a.c. output signal when and only when the amplitudes of the two d.c. input signals are in agreement and no critical circuit or component failure is present.

Various types of comparator circuits compare the amplitudes of at least two input signals and produce an output signal when the amplitudes of the input signals which are substantially equal are old and well known in the art. Normally, these previous comparator circuits are generally acceptable for use in ordinary nonvital applications but are wholly unsatisfactory for employment in special vital operations. For example, in signal and communication systems for railway or mass and/or rapid transit operations, it is mandatory that each portion or circuit of the assemblage operates in a fail-safe manner. Such a stringent operating requirement is essential in order to prevent costly damage to the equipment as well as to preclude serious injury and possible death to employees and passengers. It will be appreciated that a high speed train or mass transit vehicle is an imminently dangerous object if the control system fails in an unsafe manner. Therefore, in a vehicle speed control system a less restrictive speed command should never be capable of being simulated by a circuit or component failure. In order to ensure such operation, it is necessary to carefully analyze and examine each and every circuit component for all its shortcomings, as well as to optimize the design and layout of the circuit. Thus, it will be appreciated that a comparator circuit which is capable of producing an output signal when its input signals are out of agreement is not suitable for use in a vital type of vehicle speed control system for railway or mass and/or rapid transit operation.

Accordingly, it is an object of my invention to provide a new and improved comparator circuit which operates in a fail-safe manner.

Another object of my invention is to provide a fail-safe voltage comparator which produces an output signal only when its input signals are in agreement.

A further object of my invention is to provide a vial type of comparator circuit which is incapable of producing an output signal during a critical circuit or component failure or when its input signals are not in agreement.

Still another object of my invention is to provide 2 fail-safe voltage comparator circuit for comparing the level of a pair of d.c. voltages and producing an a.c. output when and only when the levels of the d.c. voltages are substantially equal.

Still a further object of my invention is to provide a fail-safe voltage comparing circuit employing a pair of transformers one of which is fed with an a.c. input and the other of which produces an a.c. output only when the amplitudes of a pair of d.c. inputs are in agreement.

Yet a further object of my invention is to provide a fail-safe voltage comparator having a first input transformer and a second output transformer which produces an output signal only when the amplitudes of a pair of input signals are substantially equal and no critical circuit or component failure is present.

Still yet another object of my invention is to provide a fail-safe comparator circuit which is economical in cost, simple in design, reliable in operation, durable in use, and efficient in service.

In accordance with the present invention, the unique voltage comparator circuit compares the amplitudes of a pair of d.c. inputs and only produces an a.c. output when the amplitudes of the pair of d.c. inputs are in agreement. The comparator circuit includes an input transformer and a saturable core output transformer. A source of a.c. input signals is applied to the primary winding of the input transformer. A series circuit is formed by the secondary winding of the input transformer and the primary winding of the output transformer along with a current-limiting resistor. One of the pair of d.c. inputs is connected to one end of the series circuit while the other d.c. input is connected to the other end of the series circuit. Normally, when the pair of d.c. inputs are substantially equal and the circuit is intact, only a.c. current flows through the series circuit so that an a.c. output is induced into the secondary winding of the saturable transformer. If either d.c. input varies to any degree relative to the other, a d.c. current will flow through the series circuit and cause the saturable transformer to saturate so that a.c. output signals will not appear across the secondary winding of the saturable transformer. A component or circuit failure, such as, an open or short condition, will destroy the integrity of the circuit or prevent any transformer action from occurring between the various windings. Thus, a.c. output signals are induced in the secondary winding of the output transformer when and only when the pair of d.c. inputs are in agreement and no cirtical circuit or component failure is present.

Other objects, features and advantages will be more readily appreciated as the subject invention becomes better understood by reference to the following detailed description when considered in conjunction with the accompanying drawing wherein:

The single FIGURE is schematic circuit diagram of a fail-safe electronic comparator circuit embodying the principles of the present invention.

Referring to the single figure of the drawing, there is shown a preferred embodiment of a fail-safe comparator circuit of the present invention. The fail-safe comparator circuit includes a pair of transformers T1 and T2. The first transformer T1 is a conventional type which includes a primary winding P1 and a secondary winding S1, both of which are wound on an ordinary magnetic core C1. The second transformer T2 is a saturable type which includes a primary winding P2 and a secondary winding S2, both of which are wound on a magnetic core C2 having a square hysteresis loop. That is, the core C2 is easily saturated and causes the windings P2 and S2 to possess a high impedance when little or no d.c. current flows through the primary winding P2 and causes windings P2 and S2 to have a very low or substantially zero impedance when current flows through the primary winding P2 and saturates core C2.

As shown, one end of the secondary winding S1 is connected to one end of the primary winding P2 by lead L1. One end of a current-limiting resistor R is connected to the other end of primary winding P2 by lead L2. The other end of resistor R is directly connected to input terminal 1 by lead L3. Input terminal 2 is connected to a point of reference potential, such as, ground. As shown, the other end of the secondary winding S1 is directly connected to input terminal 3 by lead L4. Input terminal 4 is also connected to a point of reference potential, such as, ground.

The input terminals 1 and 2 are connected to a suitable source of d.c. input voltage V1. The d.c. voltage source V1 may be derived of a gated type of fail-safe amplifier-rectifier-filter circuit which preferably has a relatively low impedance value. Similarly, the input terminals 3 and 4 are connected to a suitable source of c.c. voltage V2. Like source V1, d.c. source V2 may also be derived from a gated type of fail-safe amplifier-rectifier-filter circuit having a relatively low impedance value.

It will be understood that the voltage sources V1 and V2 have separate and unrelated origins which may represent different functions. For example, source V1 may be representative of the actual speed of a moving vehicle while source V2 may be representative of the last speed command signal received by the moving vehicle. If the actual speed is identical to the last received speed command signal, then the amplitudes of the voltages V1 and V2 should be substantially equal or, in other words, the voltages V1 and V2 should be in agreement. This agreement between voltages V. and V2 is checked by applying a suitable a.c. signal source to the primary winding P1 of the transformer T1. The a.c. signal source may be any conventional supply source which is readily available at the moment. If voltages V1 and V2 are in agreement, secondary winding S1 supplies a.c. signals to the primary winding P2 which, in turn, induces an a.c. voltage into the secondary winding S2 so that an output signal is produced, as will be described in detail hereinafter. If it is necessary, the a.c. output developed across secondary winding S2 may be subsequently amplified and rectified, and thereafter applied to some suitable utilization device, such as, a vital relay. Hence, when the vital relay is energized, its front contacts will be closed which is indicative that the voltages V1 and V2 are substantially identical, and thus an agreement indication will result.

Turning now to the operation of the present invention, it will be assumed that the circuit is intact and that the actual speed of the vehicle corresponds to the last received speed command signal. Under this condition, both of the amplifier-rectifier-filter circuits are gated "ON" and the d.c. voltages, namely, V1 and V2, appearing on input terminals 1, 2 and 3,4, respectively, are substantially equal. Under this condition little, if any, d.c. current will flow through the series circuit formed by the resistor R and the windings P2 and S1. That is, when voltages V1 and V2 are in agreement, a bucking or opposing action takes place so that the sum of the d.c. current in the series circuit is effectively zero. Thus, the transformer T2 remains in an unsaturated state, and the windings P2 and S2 will have a relatively high impedance. Under this condition substantially all of the a.c. signal voltage will drop across primary winding P2 so a.c. signals are induced into secondary winding S2. The a.c. signals appearing across secondary winding S2 are, in turn, amplified and rectified and are then employed to energize the vital relay. Thus, the energization of the vital relay causes its front contact to close which may be employed to provide an indication signifying that voltages V1 and V2 are in agreement. The vital relay will remain energized so long as transformer T2 remains unsaturated so that sufficient a.c. voltage is induced in secondary winding S2.

Let us now assume that the d.c. inputs across terminals 1, 2 and 3, 4 fall out of agreement due to a change in either voltage V1 or V2. Such a condition may occur due to the fact that the actual speed of the vehicle is either higher than the last received speed command signal or lower than the last received speed command signal, or vice versa.

If, for example, the value of voltage V1 becomes somewhat greater than that of voltage V2 and a sufficient amount of d.c. current flows through the primary winding P2, the core C2 of transformer T2 will become saturated. During saturation, the impedance, namely, the inductive reactance of the transformer T2 falls to a minimum value so that the primary winding P2 is effectively a short circuit. Under this condition, substantially all the a.c. voltage is dropped across and dissipated in resistor R and little, if any, a.c. voltage is developed across primary winding P2. Thus, no a.c. voltage is induced into secondary winding S2. The lack of a.c. output voltage causes the vital relay to become deenergized and its armature will release, thereby causing the front contacts to open. Thus, the opening of the relay contacts causes interruption of the agreement indication signal when voltages V1 and V2 are out of agreement.

Similar action occurs when voltage V2 becomes greater than voltage V1, except that the d.c. current flows in the opposite direction. That is, the d.c. current flows from terminal 3 through the series circuit causing core C2 to saturate in the opposite direction. Hence, when the differential voltage between voltages V1 and V2 causes sufficient current to saturate transformer T2, no a.c. output will be produced thereby signifying a lack of agreement.

It will be appreciated that the amount of d.c. current required to cause saturation is dependent upon the circuit parameters as well as upon the magnetic and electrical characteristics of the transformer T2. It will be understood that the voltage levels of voltages V1 and V2 will vary in accordance with the speed of the vehicle and the speed command signals, and, in fact, the voltages will have a zero value when the vehicle is stopped and a stop command signal is being received aboard the vehicle. Thus, the comparator circuit compares the difference in the voltage levels of voltages V1 and V2 irrespective of their specific amplitudes. In addition, as previously mentioned, no critical circuit or component failure is capable of producing or simulating an a.c. output when voltages V1 and V2 are not in agreement.

For example, the opening of any lead, terminal or element in the series circuit causes the a.c. signal path to be interrupted so that no a.c. signals will be induced into secondary winding S2.

The opening of the primary winding P1 or secondary winding S2 destroys the transformer action of transformers T1 and T2, respectively.

The shorting of turns between any of the transformer windings reduces the amplitude of the a.c. output signal and, therefore, such a failure is a safe failure.

If either voltage V1 or V2 becomes short-circuited, a differential voltage condition will be produced thereby causing saturation of transformer T2 so that no a.c. output will be available across secondary winding S2.

The resistor R is preferably constructed of a carbon composition so that this element is incapable of becoming short circuited.

Accordingly, it can be seen that this unique comparator circuit produces an output across the secondary winding S2 when and only when the potential levels of voltages V1 and V2 are in agreement and no critical circuit or component failure is present.

It is readily understood that the magnitudes and polarities of voltages V1 and V2 are of little or no consequence in that the circuit operates on a differential principle irrespective of magnitude and polarity. It will be appreciated that various alterations may be made by persons skilled in the art without departing from the spirit and scope of this invention. Therefore it is understood that all changes, equivalents, and modifications falling within the spirit and scope of the present invention are herein meant to be included in the appended claims.

Having thus described my invention, what I claim is:

1. A fail-safe voltage comparator comprising, a pair of input signals to be compared, a first transformer having a primary and a secondary winding, a source of a.c. signals coupled to said primary winding and inducing a.c. signals into said secondary winding, one end of said primary winding of said second transformer connected in series with one end of said secondary winding of said first transformer, the other end of said primary winding of said second transformer connected to one of said pair of input signals, and the other end of said secondary winding of said first transformer connected to the other of said pair of input signals so that a.c. output signals are induced in said secondary winding of said second transformer only when said pair of input signals are in agreeement and no critical circuit or component failure is present.

2. A fail-safe voltage comparator as defined in claim 1, wherein each of said pair of input signals is a d.c. voltage source.

3. A fail-safe voltage comparator as defined in claim 1, wherein said second transformer is a saturable type of transformer.

4. A fail-safe voltage comparator as defined in claim 1, a current-limiting resistor is connected in series with said primary winding of said second transformer and said primary winding of said first transformer.

5. A fail-safe voltage comparator as defined in claim 1, wherein said second transformer includes a saturable core.

6. A fail-safe voltage comparator as defined in claim 5, wherein said saturable core of said second transformer is not saturated when said pair of input signals are in agreement and is saturated when said pair of input signals are not in agreement.

* * * * *

PO-1050
(5/69)

UNITED STATES PATENT OFFICE
CERTIFICATE OF CORRECTION

Patent No. 3702939          Dated Nov. 14, 1972

Inventor(s) John O. G. Darrow

It is certified that error appears in the above-identified patent and that said Letters Patent are hereby corrected as shown below:

Column 5, Claim 1, Line 5 after the comma insert "a second transformer having a primary and a secondary winding,"

Signed and sealed this 24th day of April 1973.

(SEAL)
Attest:

EDWARD M. FLETCHER, JR.        ROBERT GOTTSCHALK
Attesting Officer                Commissioner of Patents